Aug. 23, 1966   B. V. MOLSTEDT ETAL   3,267,586
APPARATUS FOR TREATING FLUIDIZED SOLIDS SYSTEMS
Filed Sept. 17, 1964
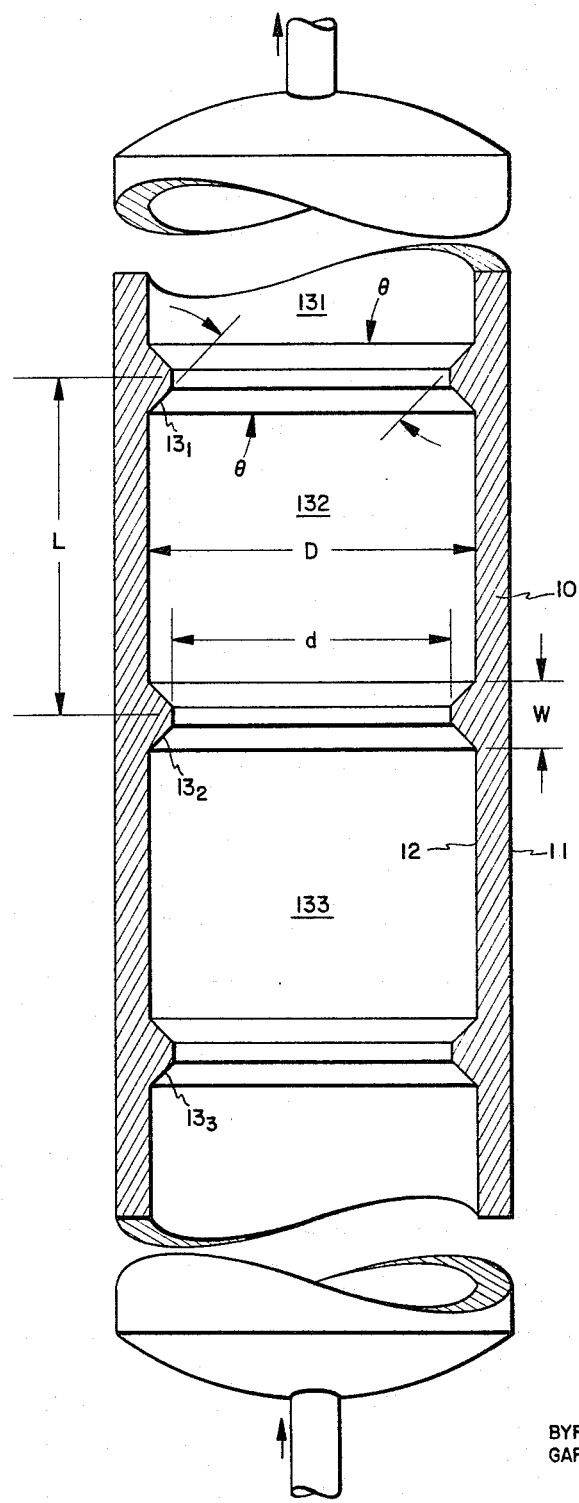
INVENTORS
BYRON VICTOR MOLSTEDT
GARY KENT PATTERSON
BY Llewellyn A. Proctor
PATENT ATTORNEY

3,267,586
APPARATUS FOR TREATING FLUIDIZED SOLIDS SYSTEMS

Byron Victor Molstedt, Baton Rouge, La., and Gary Kent Patterson, Rolla, Mo., assignors to Esso Research and Engineering Company, a corporation of Delaware
Filed Sept. 17, 1964, Ser. No. 397,186
4 Claims. (Cl. 34—57)

This invention relates to the art of processing fluidized solids systems, and especially to improvements in such art. In particular, it relates to apparatus for reduction of wall-to-wall slugging and for the improvement of gas solids contact generally in gas-solids fluidized systems operating at high temperatures.

In treating various materials it is now common practice in the chemical processing industries to suspend finely divided solids in a stream of gas, or gases, so that such gas-solids systems take on many of the attributes of liquid. These gas-solids systems, known as fluidized solids systems, or fluidized beds, take on the shape of the vessel within which confined and have also a distinct surface or "liquid level." Moreover, "bubbles" can form in the fluidized gas-solids systems as characteristic of a boiling liquid. Nevertheless, a properly stabilized system or bed is stable in the sense that all of the solids particles are in an approximately uniform state of turbulence, and the density of the system is substantially homogeneous throughout. This state then is contrasted with one wherein there appears within the system specific regions of low solids concentrations, or bubbles, these dilute masses rising upwardly to by-pass other solids and reduce gas-solids contact.

A troublesome phenomenon which occurs in fluidized gas-solids systems relates to the problem of "boiling." It is not too different from that phenomenon which occurs in a true boiling liquid. In heating a liquid, as the boiling point is approached, portions of the liquid begin to vaporize and rise from the liquid in the form of bubbles. The amount of bubble formation increases as temperature rises. When the liquid boils the temperature remains constant and bubble formation or ebullition becomes essentially constant and the surface level churns vigorously as the input heat changes the liquid to vapor. In a boiling fluidized gas-solids system, dilute masses or bubbles rise upwardly within the bed reducing gas-solids contact and hence lessening the efficiency of the system.

An even more acute problem in fluidized solids systems is that phenomenon known as wall-to-wall slugging. Such condition is also analogous to that which occurs within a true liquid. Thus, there are situations wherein boiling does not proceed smoothly and bumping, or slugging, occurs. Under such circumstances the release of vapor from the liquid does not occur smoothly but rather suddenly and sporadically. When this happens, very large bubbles suddenly form and escape from the liquid. Under such circumstances the liquid can even be physically and violently thrown from its containing vessel. In a fluidized bed the surface level of the gas-solids phase also churns and vigorously rises and falls during boiling and is especially acute when slugging occurs. Also, there are varying degrees of surface agitation occurring, depending on factors operative on the process.

In a fluidized bed, a boiling condition is not desirable, and certainly not the more extreme condition wherein slugging occurs. In such situations the gases by-pass the solids and make for very poor contact of the gas with the solids particles. Where such conditions occur, the normal good capability of the bed to transfer heat from one portion of the system to another is lessened. If slugging occurs, the efficiency of the process is thus greatly decreased inasmuch as contact between gas and solids is lessened and moreover nonuniformity of temperature throughout the bed can become acute. Slugging can even impair the operability of the process.

Numerous devices have been used for reduction of slugging, e.g., packings, internal pipes, etc. Some devices and techniques have met with varying degrees of success but all are of some complexity and ofttimes introduce new problems.

For these and other reasons it is apparent that the art is in need of new and novel apparatus, method or technique, particularly one of lesser complexity, for alleviating boiling and slugging conditions in fluidized gas-solids systems, especially in fluidized beds of coke solids. The solution of this problem is therefore the primary objective of the present invention. In particular, the objective is to provide the art with a new and improved apparatus admirably suitable for the reduction, and even elimination in some instances, of slugging. Other objects will also become apparent as the following general and detailed description unfolds.

In accordance with the present invention, the inside walls of a tubular member within which a fluidized solids system is being processed are provided at certain definite intervals with a series of spaced apart, circumferential, inwardly projecting, constricting surfaces, or diverters, which lessen the internal diameter of the tubular member to provide, in effect, a plurality of contiguous zones separated one from another by passageways, or openings, of lesser diameter than that of the zones per se. The ratio of the diameter of a passageway or connecting opening with respect to the internal diameter of the tubular member, or zone, ranges from about 0.5 to about 0.9, and preferably from about 0.7 to about 0.8. The longitudinal distance or interval between adjacent constricting surfaces, or zone length, must range from about 0.5 to about 2.0 times the inside diameter of the tubular member, and more preferably from about 1.0 to about 1.5.

Quite surprisingly it has been found that by strict observance of this dual requirement, wall-to-wall slugging is drastically reduced and in most instances completely eliminated. Moreover, even boiling is minimized and good gas-solids contact is achieved. On the other hand, however, where these conditions are not strictly observed, e.g., the ratio of the internal diameter of the restricted opening to the normal internal diameter of the tubular member is increased outside this limit, fluctuation of the bed level increases quite rapidly and upheavals within the fluidized bed become more and more violent. Conversely, when the ratio of the restricted opening to the normal zone diameter is decreased below this limit, gas-solids contact is again drastically reduced. It is believed that a phenomenon associated with decreased efficiency in this instance may be due, at least partially, to a channeling effect. Moreover, spouting bed conditions occur and there is even a tendency for the solids to bridge within the restricted openings. Boiling and slugging conditions also occur when the ratio of the longitudinal distance between constricting surfaces to that of the normal zone diameter is not observed.

Apparatus of such character is particularly useful as reactors in the chemical reduction of metallic ores—e.g., as in the processing of oxidic iron ores in a fluidized iron ore reduction system wherein an ore is suspended or fluidized in a stream of reducing gas at high temperature and under conditions which reduce the oxide particles to metallic iron. Such apparatus is especially effective in fluidized coking systems wherein carbon particles are suspended in a stream of hot gases. Such apparatus is particularly effective for reducing slugging and in obtaining better gas-solids contact in lines, tubes, reactors and the like wherein the internal diameter is no greater than about five feet. The apparatus is most applicable also to the treatment of solids, the concentration of which lies in the dense phase domain, as contrasted with dilute or disperse phases.

The foregoing invention will be better understood by specific reference to the accompanying drawing, and to the detailed description making reference thereto, showing a partial half-section view of a tubular member characterized in accordance with an embodiment of this invention.

Referring to the figure there is shown a tubular vessel or reactor 10, the wall of which has an external side 11 and an internal side 12. Within the vessel 10 and along the tubular axis thereof is contained a plurality of circumferential corrugations, rings or diverters $13_1$, $13_2$, $13_3$ extending inwardly and aligned in planes substantially parallel one to another. The diverters 13 are closed rings or corrugations which extend 360° around the circumference of internal wall face 12 of the vessel 10 and form, in effect, a series of contiguous zones 131, 132, 133 separated one from another by the constricted openings formed therebetween—e.g., zones 132, 133 are separated by diverters $13_1$, $13_2$, respectively. Each constricted opening or zone lies in a plane substantially perpendicular to an axis passing through the center of vessel 10.

The ratio of the diameter of a restricted opening $d$ to that of the tubular vessel $D$—i.e., $d/D$—and the ratio of the lateral or longitudinal distance between adjacent pairs of restricted openings L to the diameter of tubular vessel $D$—i.e., $L/D$—bears a certain critical relationship one dimension to the other. As stated, $d/D$ ranges from about 0.5 to about 0.9 and preferably from about 0.7 to about 0.8 while $L/D$ ranges from about 0.5 to about 2.0, and preferably from about 1.0 to about 1.5. Moreover, the requirements regarding the relationship between $d/D$ and $L/D$ are interrelated and dual, and both conditions must exist simultaneously By strict adherence to these relationships, operability and gas-solids contacting in fluidized beds are greatly improved over apparatus failing to utilize such practice.

The edges of the restricting surfaces should be tapered, and should provide an angle $\theta$ ranging from about 45° to about 60° from a vertical line located at the point when the edge begins to slope from horizontal. The width W or thickness of a restricting surface or diverter should preferably range from about 0.05 to about 0.3, and most preferably from about 0.15 to 0.25, of the lateral dimension between adjacent pairs of openings L.

A feature of this invention resides in the simplicity of construction of the apparatus and particularly its adaptability even at extremely high temperatures wherein is necessitated refractory lined high temperature reactors. Moreover, there is little inhibiting effect on horizontal or vertical solids mixing as is the case where more complex methods are used to reduce slugging and for improving gas-solids contact.

It is apparent that some modifications can be made without departing from the spirit and scope of the invention and therefore the invention should not be limited to the precise embodiment described, but only limited within the spirit and scope of the appended claims.

What is claimed is:

1. Apparatus for the improvement of gas-solids contact in fluidized solids systems and for the reduction of slugging comprising a tubular member containing therein a plurality of spaced apart, circumferentially, inwardly projecting, constricting surfaces which lessen the internal diameter of the member to provide, in effect, a series of contiguous zones separated one from another by passageways of lesser diameter than that of the internal diameter of the tubular member, the ratio of the diameter of a passageway relative to the internal diameter of the tubular member ranging from about 0.5 to about 0.9 and the longitudinal distance between constricting surfaces ranging from about 0.5 to about 2.0 times the internal diameter of the tubular member.

2. The apparatus of claim 1 wherein the ratio of the diameter of a passageway formed by a constricting surface to that of the internal diameter of the tubular member ranges from about 0.7 to about 0.8 and the longitudinal distance between constricting surfaces ranges from about 1.0 to about 1.5.

3. Apparatus for the improvement of gas-solids contact in fluidized solids systems and for the reduction of slugging comprising a tubular member internally aligned with a plurality of uniformly spaced, inwardly projecting, constricting surfaces of width ranging from about 0.05 to about 0.3 times the longitudinal distance between restricting surfaces to provide, in effect, a series of contiguous zones separated one from another by passageways of lesser diameter than that of the internal diameter of the tubular member, the ratio of the diameter of a passageway relative to the internal diameter of the tubular member ranging from about 0.5 to about 0.9, and the longitudinal distance between constricting surfaces ranging from about 0.5 to about 2.0 times the internal diameter of the tubular member and wherein the edge of each constricting surface is tapered.

4. The apparatus of claim 3 wherein an edge of the constricting surface provides an angle ranging from about 45° to about 60° from vertical.

References Cited by the Examiner

UNITED STATES PATENTS

| 1,551,956 | 9/1925 | Hubmann | 23—288.3 |
| 2,395,090 | 2/1946 | Arnold | 34—57 |
| 2,688,195 | 9/1954 | Hyer | 34—57 |

JOHN J. CAMBY, *Primary Examiner.*